(12) United States Patent
Sugiura et al.

(10) Patent No.: US 10,401,919 B2
(45) Date of Patent: Sep. 3, 2019

(54) ELECTRONIC DEVICE AND CONTROL BOARD FOR TUNING UP SPEAKER

(71) Applicant: Toshiba Client Solutions CO., LTD., Koto-ku, Tokyo (JP)

(72) Inventors: Yusuke Sugiura, Ome Tokyo (JP); Tomofumi Miyamoto, Hamura Tokyo (JP)

(73) Assignee: Toshiba Client Solutions CO., LTD., Tokyo (JP)

( * ) Notice: Subject to any disclaimer, the term of this patent is extended or adjusted under 35 U.S.C. 154(b) by 0 days.

(21) Appl. No.: 16/046,775

(22) Filed: Jul. 26, 2018

(65) Prior Publication Data

US 2019/0220067 A1    Jul. 18, 2019

(30) Foreign Application Priority Data

Jan. 12, 2018 (JP) ................................. 2018-003455

(51) Int. Cl.

| | |
|---|---|
| *G06F 1/16* | (2006.01) |
| *H01Q 1/22* | (2006.01) |
| *H04R 1/02* | (2006.01) |
| *H04R 3/00* | (2006.01) |
| *H01Q 1/24* | (2006.01) |

(52) U.S. Cl.
CPC .......... *G06F 1/1688* (2013.01); *G06F 1/1616* (2013.01); *G06F 1/1698* (2013.01); *H01Q 1/2266* (2013.01); *H04R 1/025* (2013.01); *H04R 3/00* (2013.01); *G06F 1/1681* (2013.01); *H01Q 1/241* (2013.01); *H04R 2499/15* (2013.01)

(58) Field of Classification Search
CPC .. H04R 2499/11; H04R 3/04; H04R 2499/15; H03G 5/165
USPC ........................ 381/333, 334, 336, 101, 103
See application file for complete search history.

(56) References Cited

U.S. PATENT DOCUMENTS

| | | | |
|---|---|---|---|
| 9,329,685 B1 * | 5/2016 | Puskarich | ............ H03K 17/975 |
| 2011/0091051 A1 * | 4/2011 | Thomason | ............ G06F 1/1616 381/103 |
| 2012/0299780 A1 * | 11/2012 | Hsieh | ................... H01Q 1/2266 343/700 MS |

FOREIGN PATENT DOCUMENTS

| | | |
|---|---|---|
| JP | 2007-124205 A | 5/2007 |
| JP | 2007-143086 A | 6/2007 |
| JP | 2010-171740 A | 8/2010 |

* cited by examiner

*Primary Examiner* — Alexander Jamal
(74) *Attorney, Agent, or Firm* — Knobbe, Martens, Olson & Bear, LLP

(57) ABSTRACT

According to one embodiment, an electronic device includes a first housing including an antenna for wireless communication, and a second housing including a speaker for audio output configured to be used in a state where the second housing overlaps the first housing. When the antenna and the speaker are seen through from an upper surface side of the first housing, a location of the antenna and a location of the speaker do not relatively overlap each other.

17 Claims, 4 Drawing Sheets

ELECTRONIC DEVICE AND CONTROL BOARD FOR TUNING UP SPEAKER

CROSS-REFERENCE TO RELATED APPLICATIONS

This application is based upon and claims the benefit of priority from Japanese Patent Application No. 2018-003455, filed Jan. 12, 2018, the entire contents of which are incorporated herein by reference.

FIELD

Embodiments described herein relate generally to an electronic device.

BACKGROUND

Generally, among electronic devices such as notebook computers and mobile computers, for example, an electronic device in which a keyboard (main body) portion and a display portion respectively constitute housings and the two housings are used in combination has been known.

This kind of the electronic device includes a model in which the two housings are connected by a hinge, (hereinafter sometimes called "a hinged model"), and a model which can be flexibly used in a state where these housings are detached from each other and in a state where these housings overlap each other as a tablet mode (hereinafter sometimes called "a detachable model"), depending on circumstances, for example.

Here, one example of the hinged model is the so-called 2-in-1 model which can be used both in the tablet mode (in which the housings are rotated substantially 360 degrees from a closed state) and in a clamshell mode (in which the housings are rotated at an angle of, for example, from 90 degrees to 180 degrees from the closed state) as the two housings are rotated relatively to each other about the axis of a hinge portion.

In some cases, both the hinged model and the detachable model may be used in the state where two housings overlap each other as the tablet mode.

As described above, both the model having two hinged housings and the model having two detachable housings may be used in the tablet mode.

Here, an electronic device may have one housing (first housing) equipped with a display, an antenna for wireless communication, etc., and another housing (second housing) equipped with a control board for arithmetic processing, a keyboard and a touchpad for input, a battery, a memory, a speaker for audio output, etc., for example, and may be used in the tablet mode. The antenna includes, for example, a communication antenna for a wireless LAN (or Wi-Fi), a communication antenna for Long Term Evolution (LTE), etc. In this case, an antenna portion of the first housing and a speaker portion of the second housing are arranged such that, when seen through from above in a state where the two housings overlap each other, the antenna portion and the speaker portion may overlap each other or may be located close to each other in some cases. Recently, there has been a tendency to reduce the housings in thickness, and if the antenna portion and the speaker portion overlap each other or are located close to each other, radio waves may be reflected on a metal component which constitutes part of the speaker portion, and the antenna performance may be degraded.

Further, for example, in the case of using a communication antenna for LTE, as compared to the case of using a communication antenna for a wireless LAN, radio waves used in communications have a wide frequency band, and radio waves are transmitted over and received from (a base station, a relay device, etc., located at) a long distance. Therefore, as compared to the communication antenna for the wireless LAN, the antenna performance (communication quality) of the communication antenna for LTE tends to be degraded more easily. Consequently, when the communication antenna for LTE is mounted, in particular, the impacts of the speaker and other metal components (such as panel members of the housings, for example) on radio waves of an antenna for wireless communication needs to be taken into consideration, and necessary antenna performance needs to be sufficiently secured.

Accordingly, the present embodiment provides an electronic device which can prevent impacts on radio waves given by metal components in a speaker, for example, and thereby can secure necessary antenna performance.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic device includes a first housing including an antenna for wireless communication, and a second housing including a speaker for audio output configured to be used in a state where the second housing overlaps the first housing. When the antenna and the speaker are seen through from an upper surface side of the first housing, a location of the antenna and a location of the speaker do not relatively overlap each other.

An electronic device according to an embodiment will be described hereinafter with reference to FIGS. 1 to 6.

Figure 1:
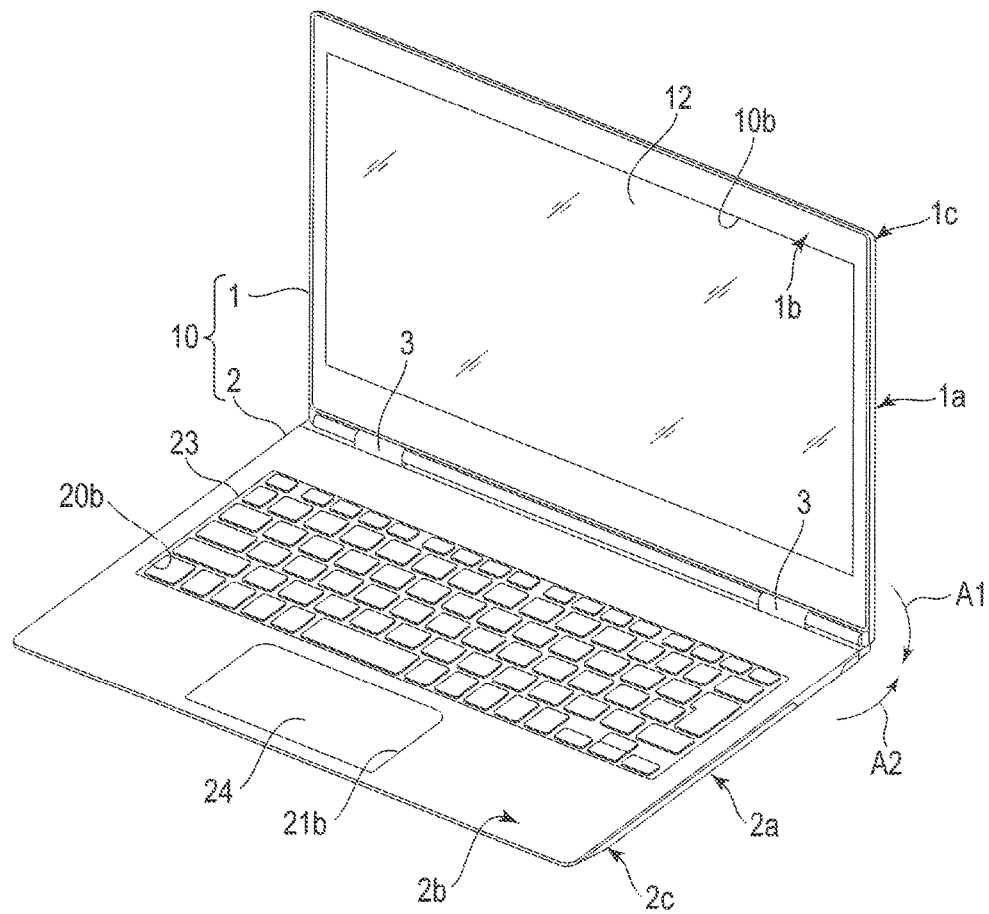
FIG. 1 is a schematic view of an overall electronic device of an embodiment and shows an example where the electronic device is used in a clamshell mode.
Figure 2:
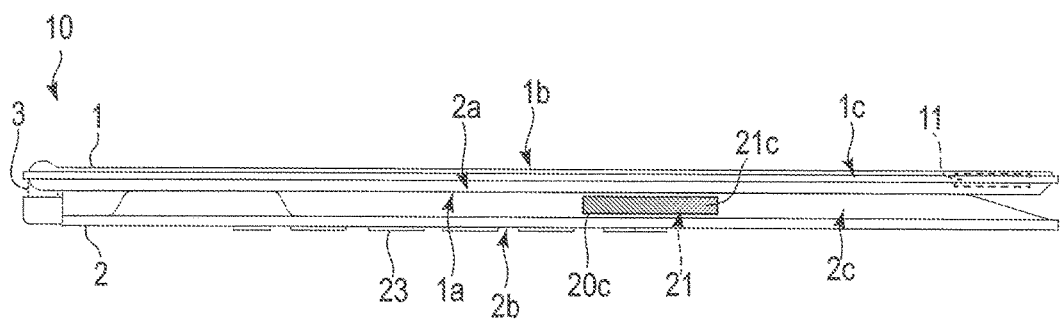
FIG. 2 is a side view of the electronic device of the embodiment and shows an example where the electronic device is used in a tablet mode.

FIGS. 1 and 2 show the structure of a notebook computer as an example of an electronic device 10 according to an embodiment. As shown in FIGS. 1 and 2, the electronic device 10 includes two housings 1 and 2, and a hinge portion 3 configured to connect these housings 1 and 2. In the present embodiment, the two housings 1 and 2 are flat and substantially rectangular parallelepiped, the hinge portion 3 is provided in the longitudinal direction of the housings 1 and 2, and the two housings 1 and 2 are connected to each other, accordingly.

As the two housings 1 and 2 are rotated about the axis of the hinge portion 3, the electronic device 10 is realized as the 2-in-1 model which can be used in two states. In the two states, the first state is a state where the two housings 1 and 2 are opened, and the second state is a state where the housings 1 and 2 overlap each other. In the following description, the usage in the first state is referred to as a clamshell mode, and the usage in the second state is referred to as a tablet mode. FIG. 1 shows an example of the usage of the electronic device 10 in the clamshell mode. FIG. 2 shows an example of the usage of the electronic device 10 in the tablet mode. The tablet mode shown in FIG. 2 corresponds to a state where the two housings 1 and 2 are rotated relatively to each other from the clamshell mode shown in FIG. 1 in the directions of arrows A1 and A2 such that the two housings 1 and 2 overlap each other.

The housings 1 and 2 have first surface portions 1a and 2a, second surface portions 1b and 2b and third surface portions 1c and 2c, respectively. Various components such as an antenna 11 and a speaker 21 which will be described later are covered with these surface portions. The first surface portions 1a and 2a are surface portions which are opposed to each other in the tablet mode. Each of the second surface portions 1b and 2b corresponds to the back side of the first surface portion and is a surface portion which faces the outside (in the direction opposite to the counterpart housing) in the tablet mode. On the other hand, the second surface portions 1b and 2b are opposed to each other in the closed state. The third surface portions 1c and 2c are surface portions (side surface portions) which constitute frame portions which are formed continuously between the first surface portions 1a and 2a and the second surface portions 1b and 2b along edges thereof.

Figure 3:
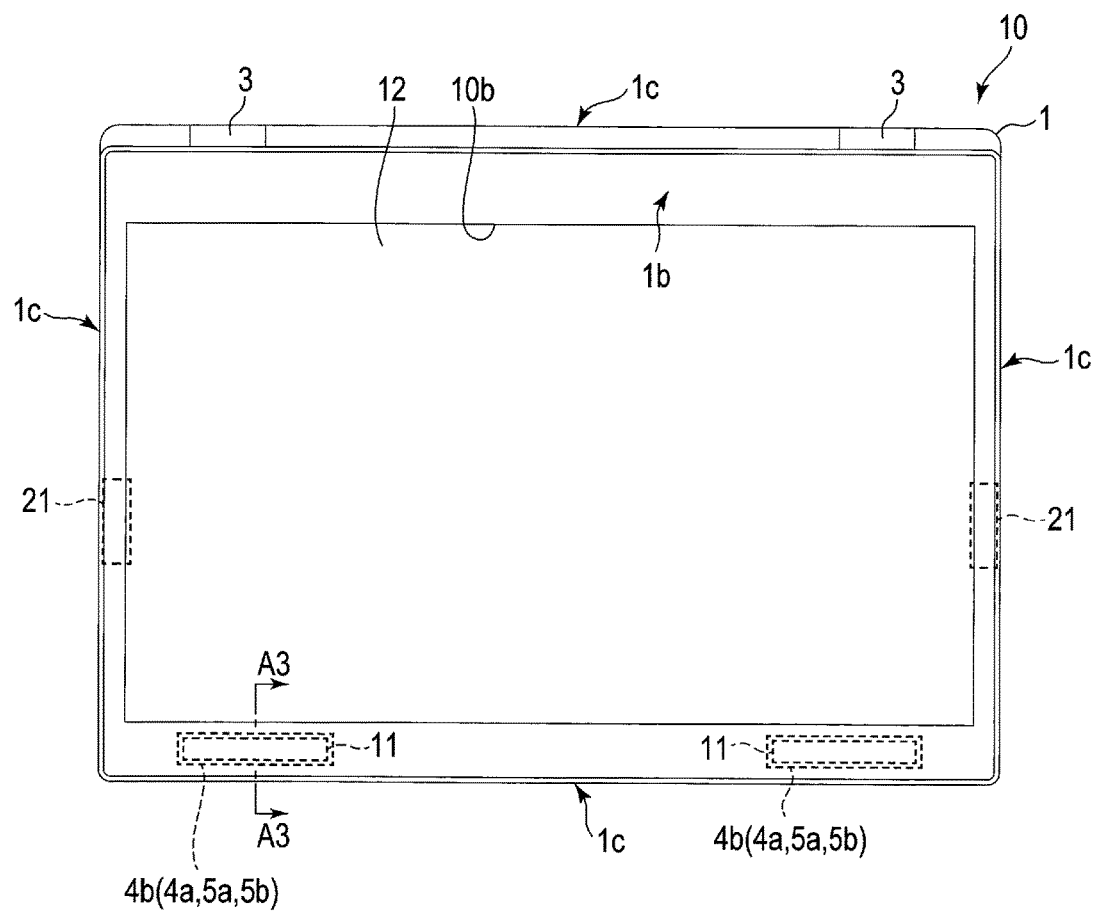
FIG. 3 is a top view from one housing (first housing) side when the electronic device of the embodiment is used in the tablet mode.
Figure 4:
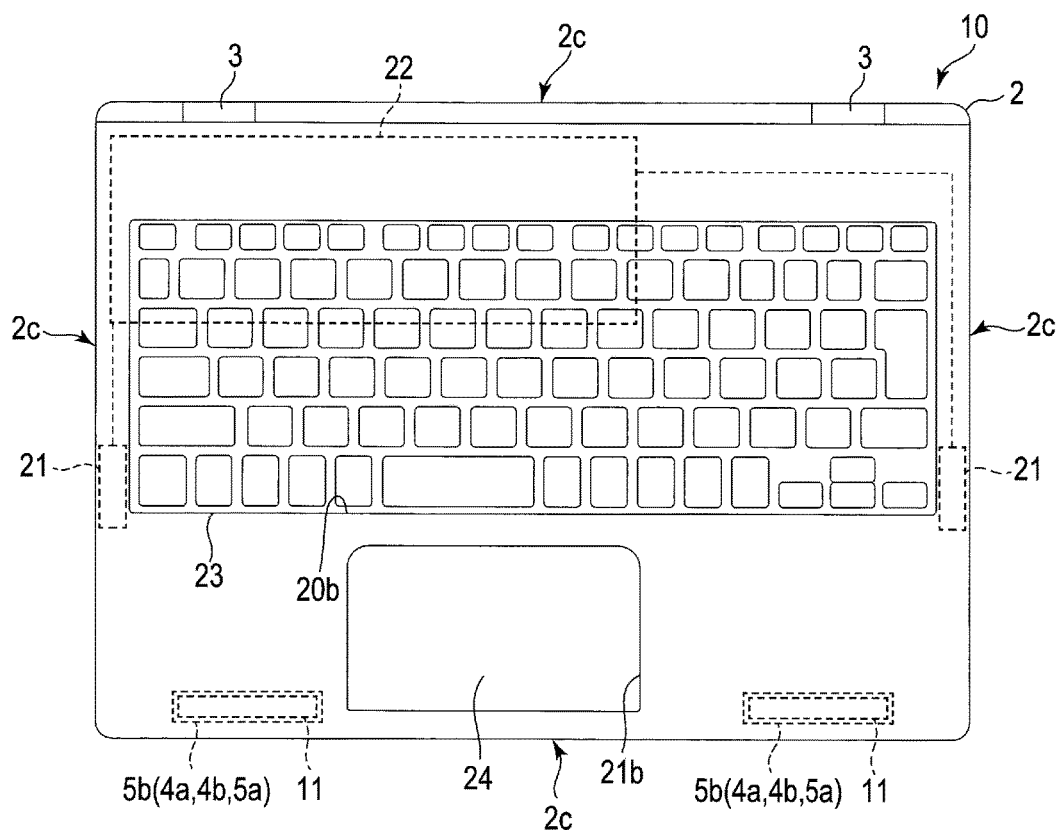
FIG. 4 is a back view from the other housing (second housing) side when the electronic device of the embodiment is used in the tablet mode.

FIG. 3 is a top view from one housing (hereinafter referred to as the first housing 1) side when the electronic device 10 is used in the tablet mode. FIG. 4 is a back view from the other housing (hereinafter referred to as the second housing 2) side when the electronic device 10 is used in the tablet mode. In the following description, the second surface portion 1b is assumed to be the upper surface of the first housing, and the second surface portion 2b is assumed to be the back surface of the second housing.

As shown in FIGS. 2 to 4, the antenna 11 for wireless communication, a display 12, etc., are mounted on the first housing 1. The display 12 has a panel portion in an opening 10b which is formed in such a manner as to be surrounded by the peripheral portion of the second surface portion 1b. The panel portion of the display 12 may be used exclusively for ordinary display of an image and text information or may also have the function of operating an input touch panel, etc.

The antenna 11 includes a ground portion, a short circuit portion, an emitter portion (all of which are omitted in the drawing), etc. The antenna 11 is provided in the first housing 1 and is arranged on the lower side of the peripheral portion of the second surface 1b.

As shown in the drawing, the present embodiment shows an example where the pair of antennas 11 are arranged near the corners on the side away from the hinge portion 3 of the first housing 1.

A communication antenna for Long Term Evolution (LTE) is used in the present embodiment. However, a communication antenna for a wireless LAN (Wi-Fi) and various other antennas for wireless communication can also be applied.

On the other hand, the speaker 21 for audio output, a control board 22 for arithmetic processing, a keyboard 23 and a touchpad 24 for input, a battery, a memory (both of which are omitted in the drawing), etc., are mounted on the second housing 2 as shown in the drawing. The keyboard 23 and the touchpad 24 have the key tops of keys and a pad portion, respectively, in an opening 20b and an opening 21b which are formed in the second surface portion 2b. The control board 22, the battery and the memory are arranged in a space between the first surface portion 2a and the keyboard 23.

The speaker 21 includes a transducer portion, a box (enclosure) portion, etc. The speaker 21 is arranged in the second housing 2 according to the arrangement of the antennas 11 in the first housing 1. The relative locations of the speaker 21 and the antenna 11 will be described below.

In the present embodiment, to reduce the impact of the speaker 21 on the antenna 11, relative locations are set to the speaker 21 and the antennas 11. As shown in the drawing, when the antenna 11 and the speaker 22 are seen through from the upper surface side of the first housing, that is, the second surface portion 1b side (or the back surface side of the second housing, that is, the second surface portion 2b side), the antennas 11 and the speaker 21 are located at a predetermined distance or more (for example, 100.0 mm or more) from each other such that the antennas 11 and the speaker 21 do not even partially relatively overlap each other in a direction in which the first housing 1 and the second housing 2 overlap each other. Here, when the first housing 1 including the antennas 11 and the second housing 2 including the speaker 21 overlap each other, the thickness is 16.0 mm or less.

Figure 5:
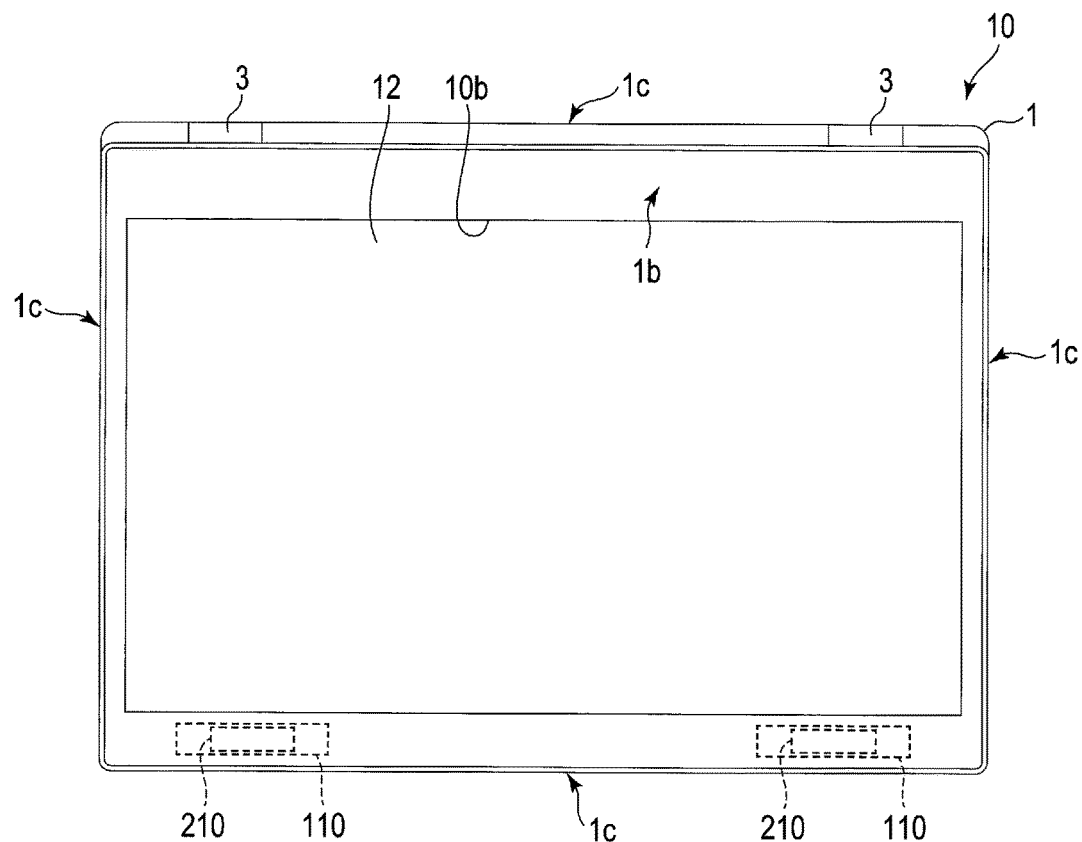
FIG. 5 is a top view from one housing (first housing) side when an electronic device of a comparative example is used in a tablet mode.

Accordingly, in contrast to a comparative example shown in FIG. 5 where the location of an antenna 110 and the location of a speaker 210 relatively overlap each other in a direction in which the first housing 1 and the second housing 2 overlap each other, reflection of radio waves on metal components of the speaker 210, etc., can be prevented. According to the present embodiment, the impact of the speaker 21 on the radio waves can be prevented, and therefore excellent performance (communication quality) of the antennas 11 can be well secured. Therefore, even if the electronic device 10 is used in the tablet mode, an excellent LTE communication environment can be maintained.

Further, although not shown in the drawing, even when the metal component of the speaker 21 partially overlaps the antenna 11 or the metal component of the speaker 21 does not overlap but is arranged very close to the speaker 21, the radio waves will be affected. In the present embodiment, the antennas 11 and the speaker 21 are arranged at a predetermined distance from each other such that the radio waves will not be affected, and therefore necessary antenna performance (communication quality) can be secured.

The speaker 21 can be arranged in any location in the second housing 2 as long as the antennas 11 and the speaker 21 have the above-described positional relationship. As shown in FIG. 4, in the present embodiment, the pair of speakers 21 are arranged in a region which is close to the third surface portion 2c from the keyboard 23 in the longitudinal direction of the second housing 2 and in a region which is close to a central portion in the lateral direction of the second housing 2. Accordingly, the arrangement regions of the speakers 21 can be easily secured without causing trouble over the arrangement of other components such as the control board 22, the keyboard 23 and the touchpad 24 which are mounted on the second housing 2. An opening 20c is formed in a portion of the third surface portion 2c which is opposed to the speaker 21, and the speaker 21 (more specifically, the transducer portion) faces the outside from the opening 20c. The opening 20c is provided with a net member 21c, etc., and the speaker 21 is protected.

To reduce the impact of the speaker 21 on the radio waves, the present embodiment adopts a structure where the first housing 1 and the second housing 2 are partially formed of non-metal, in addition to the above-described positional relationship between the speaker 21 and the antenna 11.

Figure 6:
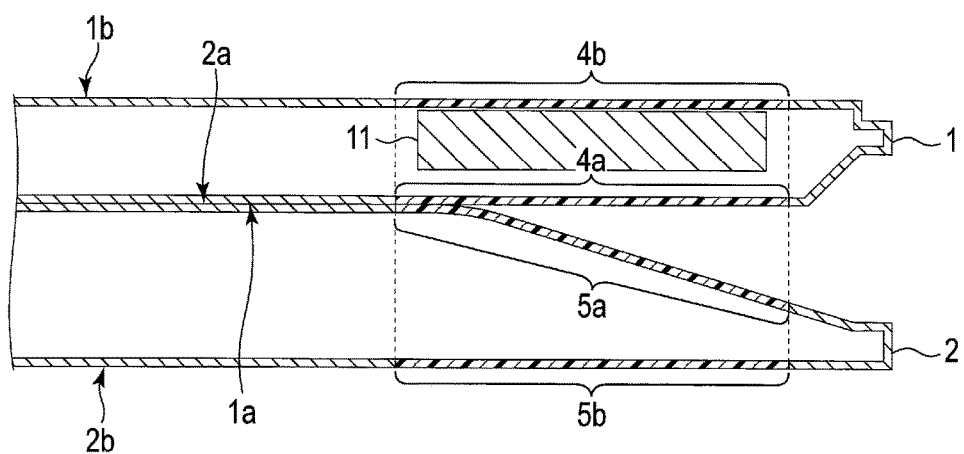
FIG. 6 is an enlarged sectional view of the electronic device of the embodiment from the direction of an arrow A3 shown in FIG. 3.

FIG. 6 is an enlarged sectional view from the direction of an arrow A3 shown in FIG. 3. As shown in FIGS. 3, 4 and 6, as the first surface portions 1a and 2a and the second surface portions 1b and 2b are seen through from the upper surface side of the first housing (or the bask surface side of the second housing), portions (hereinafter referred to as non-metal portions) 4a, 4b, 5a and 5b, which relatively overlap the antenna 11 in terms of locations, are non-metal. The non-metal portions 4a, 4b, 5a and 5b are formed of resin. The resin may be the same material or may be different materials. As long as the location of the antenna 11 and the location of the speaker 21 are at a predetermined distance from each other, the non-metal portions 4a, 4b, 5a and 5b may be provided in regions which are larger in size than the antenna 11. The non-metal portions 4a, 4b, 5a and 5b may not have the same size as each other. Accordingly, degradation of antenna performance (communication quality) in the tablet mode can be prevented, and an excellent communication environment can be maintained.

The portions other than the non-metal portions 4a, 4b, 5a and 5b of the first housing 1 and the second housing 2 are metal (magnesium alloy, for example). However, if strength and durability can be secured, for example, the first housing 1 and the second housing 2 may be entirely formed of non-metal (resin, for example).

Although an LTE communication antenna is used in the present embodiment as described above, a wireless LAN (Wi-Fi) communication antenna, etc., is also applicable. Further, the speaker 21 is arranged according to the arrangement of the antenna 11. Therefore, the speaker 21 needs to be appropriately tuned based on the type of the antenna 11, the arrangement (mounting location) of the speaker 21, etc. Consequently, the audio quality (such as the pitch and the tone) of the speaker 21 will be properly tuned regardless of the type of the antenna 11, the arrangement of the speaker 21, etc. In the present embodiment, firmware incorporated in the controller configured to control the speaker 21, namely, the control board 22 performs the following tuning.

In the activation of the electronic device 10, the firmware detects the presence or absence of connection of the antenna 11 in a communication module of the control board 22. If the firmware detects connection of the antenna 11, the firmware tunes the speaker based on the assumption that the speaker is arranged in a location facing outside via the opening 20c of the third surface portion 2c. For example, the firmware performs tuning based on the assumption that the speaker does not directly face the user. On the other hand, if the firmware does not detect connection of the antenna 11 (for example, if the firmware detects connection of a wireless LAN communication antenna), the firmware tunes the speaker differently from if the firmware detects connection of the antenna 11. For example, if speakers are arranged on both sides of the touchpad 24, the firmware tunes based on the assumption that the speakers directly face the user.

Accordingly, even if the arrangement (mounting location) of a speaker varies between an electronic device including an LTE communication antenna and an electronic device including a wireless LAN communication antenna, the audio quality of the speaker can be properly tuned regardless of the arrangement.

Further, the firmware may detect, for example, speaker performance (output, for example) and may change the tuning of the speaker 21 according to the detected performance. For example, the firmware detects output of the speaker based on the presence or absence of signal transmission to a receptacle terminal on the speaker side. Accordingly, even if electronic devices of different speaker performance exist, audio qualities thereof can be optimized according to the performance of speakers mounted thereon.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the present embodiment, the two housings 1 and 2 are connected to each other by the hinge portion 3, and are rotated relatively to each other about the axis of the hinge portion 3. Instead, the two housings may be formed integrally and detachably. In that case, the two housings can be used in a state where the two housings are detached from each other and can also be used in a state where the two housings integrally overlap each other, that is, in the tablet mode.

Further, although the arrangement of the speaker 21 with respect to the antenna 11 is changed in the present embodiment, the relative locations may also be set by changing the arrangement of the antenna 11 or both the speaker 21 and the antenna 11.

What is claimed is:
1. An electronic device comprising:
a first housing which is a rectangular parallelepiped, the first housing including a display and an antenna for wireless communication outside the display;
a second housing which is a rectangular parallelepiped, the second housing including a speaker for audio output; and
a hinge portion configured to connect the first housing and the second housing, wherein
the antenna is provided in an edge portion opposed to the hinge portion of the first housing,
a speaker is provided in each of edge portions extending from the hinge portion side of the second housing, and
when the first housing and the second housing overlap each other by action of the hinge portion, a location of the antenna and a location of the speaker do not relatively overlap each other.
2. The electronic device of claim 1, wherein
the antenna is provided in each of right and left ends of the edge portion of the first housing, and
the speaker is provided in each of the edge portions of the second housing, the edge portions being located on both sides of a keyboard provided on an upper surface of the second housing.

3. The electronic device of claim 1, wherein
when the first housing and the second housing overlap each other by the action of the hinge portion, the antenna and the speaker are located at a distance from each other, and
the distance is greater than a thickness in a state where the first housing and the second housing overlap each other.

4. The electronic device of claim 1, wherein the hinge portion is configured to rotate the first housing and the second housing relatively to each other between a state where the first housing and the second housing overlap each other and a state where the first housing and the second housing are opened.

5. The electronic device of claim 1, wherein
the second housing comprises a surface portion which covers the speaker, and
when the first housing and the second housing overlap each other by the action of the hinge portion, part of the surface portion in which a location thereof relatively overlaps the location of the antenna is non-metal.

6. The electronic device of claim 5, wherein the second housing has a first surface portion which is opposed to the first housing in a state where the second housing overlaps the first housing, a second surface portion which faces outward in a state where the second housing overlaps the first housing, and a third surface portion which is formed continuously between the first surface portion and the second surface portion along edges thereof, and
part of the first surface portion and part of the second surface portion in which locations thereof relatively overlap the location of the antenna are resin.

7. The electronic device of claim 5, wherein part of the second housing other than the non-metal part is metal.

8. The electronic device of claim 5, wherein the non-metal part of the second housing is a region which is larger than a size of the antenna.

9. The electronic device of claim 1, wherein the first housing comprises a surface portion which covers the antenna, and
when the first housing and the second housing overlap each other by the action of the hinge portion, part of the surface portion in which a location thereof overlaps the location of the antenna is non-metal.

10. The electronic device of claim 9, wherein
the first housing has a first surface portion which is opposed to the second housing in a state where the first housing overlaps the second housing, a second surface portion which faces outward in a state where the first housing overlaps the second housing, and a third surface portion which is formed continuously between the first surface portion and the second surface portion along edges thereof, and
part of the first surface portion and part of the second surface portion in which locations thereof relatively overlap the location of the antenna are resin.

11. The electronic device of claim 9, wherein part of the first housing other than the non-metal part is metal.

12. The electronic device of claim 9, wherein the non-metal part of the first housing is a region which is larger than a size of the antenna.

13. The electronic device of claim 1, wherein one of the first housing and the second housing comprises a controller configured to control the speaker, and
the controller is configured to tune the speaker according to a mounting location of the speaker on the second housing.

14. The electronic device of claim 13, wherein the controller is configured to detect presence or absence of connection of the antenna at a time of activation of the electronic device and to change tuning of the speaker according to the presence or absence of connection of the antenna.

15. The electronic device of claim 14, wherein the controller is configured to perform tuning for a state where the speaker does not directly face a user of the electronic device if the controller detects connection of the antenna and to perform tuning for a state where the speaker directly faces the user if the controller does not detect connection of the antenna.

16. The electronic device of claim 13, wherein the controller is configured to detect performance of the speaker and to change tuning of the speaker according to the detected performance.

17. The electronic device of claim 1, wherein the antenna is an antenna for LTE communication.

* * * * *